United States Patent Office 3,350,311
Patented Oct. 31, 1967

3,350,311
LUBRICATING FLUIDS CONTAINING 4,4'-BIS(TRI-ORGANOSILYL)DIPHENYLALKYLAMINES
Matthew J. Napoli, Chicago, Ill., assignor to Dow Corning Corporation, Midland, Mich., a corporation of Michigan
No Drawing. Original application June 17, 1963, Ser. No. 288,526, now Patent No. 3,308,144, dated Mar. 7, 1967. Divided and this application Nov. 9, 1966, Ser. No. 592,980
4 Claims. (Cl. 252—49.6)

ABSTRACT OF THE DISCLOSURE

Lubricating fluids are stabilized by the addition of 4,4'-bis(triorganosilyl)diphenylalkylamines.

This application is a division of application Serial No. 288,526, filed June 17, 1963, which is now U.S. Patent No. 3,308,144.

This invention relates to lubricating fluids containing 4,4'-bis(triorganosilyl)diphenylalkylamine compounds and to methods of stabilizing lubricating fluids therewith.

The compounds of this invention are useful, for example, as antioxidants in high temperature lubricating fluids or as corrosion inhibitors. The compounds of this invention can also be used to prepare quaternium compounds which can be used as corrosion inhibitors, textile treating agents, germicides, etc.

It is an object of the present invention to prepare new 4,4' - bis(triorganosilyl)diphenylalkylamine compounds. The compounds of this invention have the general formula

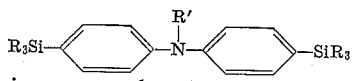

wherein R is a monovalent hydrocarbon group free of aliphatic unsaturation containing from 1 to 18 inclusive carbon atoms and R' is an alkyl group containing from 1 to 18 inclusive carbon atoms.

The R groups can be any monovalent hydrocarbon radical free of aliphatic unsaturation containing from 1 to 18 carbon atoms. For example, R can be an alkyl group such as a methyl, ethyl, propyl, butyl, amyl, hexyl, heptyl, octyl, decyl, dodecyl, pentadecyl, octadecyl, isopropyl, isobutyl, tertiary butyl, or 2-ethylhexyl group; a cycloalkyl group such as a cyclobutyl, cyclopentyl or cyclohexyl group; an aryl group such as a phenyl, xenyl or naphthyl group; an aralkyl group such as a benzyl or 2-phenylethyl group; or an alkaryl group such as a tolyl, xylyl or mesityl group. Obviously in any one compound each R can be the same or different groups. Particularly preferred compounds are those in which the R groups are phenyl and/or methyl groups.

The R' group can be any alkyl group containing from 1 to 18 carbon atoms. For example, R' can be a methyl, ethyl, propyl, isopropyl, butyl, isobutyl, tertiary butyl, amyl, isoamyl, hexyl, octyl, dodecyl, pentadecyl or an octadecyl group. Particularly preferred compounds are those in which R' is a methyl or ethyl group.

The compounds of this invention are prepared by first preparing a 4,4'-dilithiodiphenylalkylamine and then reacting this reagent with a chlorosilane. The first reaction is represented by the equation:

(1)

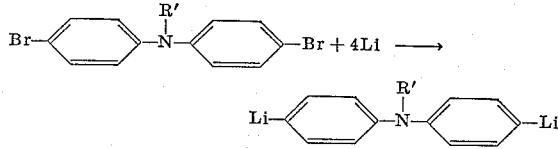

The new compounds of this invention are obtained by reacting the above dilithio derivative with a chlorosilane in accordance with the following equation:

(2)

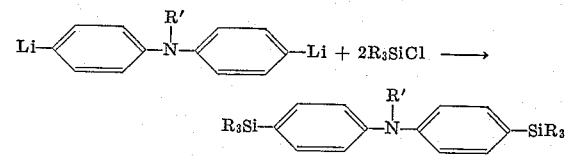

R and R' in the formulae in the equations are as defined above.

Diethylether is a suitable solvent for both of the foregoing reactions. The reactions are best conducted at reflux temperature.

The compounds of this invention, in particular the 4,4'-bis(phenyldimethylsilyl)diphenyl-N-ethylamine; 4,4'-bis(diphenylmethylsilyl)diphenyl-N-ethylamine and the 4,4'-bis(diphenylmethylsilyl)diphenyl-N-methylamine, are useful as antioxidants for high temperature lubricating fluids. From .2 to 5 percent by weight (based on the weight of the lubricating fluid) of these compounds can be used to stabilize lurbicating fluids. These compounds are especially useful as antioxidants in trimethylolpropane triester fluids.

Now in order that those skilled in the art can better understand how the present invention can be practiced, the following examples are given by way of illustration and not by way of limitation. The following examples are exemplary of the best method of the preparation of the compounds of this invention, however, other methods can be employed. In each example, the reaction was carried out in a nitrogen atmosphere.

Example 1

A 500 ml., 3-neck flask was equipped with condenser, stirrer, addition funnel and thermometer. 100 ml. of diethylether and 1.94 g. (0.28 gram-atoms) of lithium wire (cut into 112 pieces) were added. 20 g. (0.056 mol) of 4,4'-dibromodiphenyl-N-ethylamine was dissolved in 200 ml. of diethylether and placed in the addition funnel. About 15 ml. of the 4,4'-dibromodiphenyl-N-ethylamine ether solution was added to the reaction mixture with vigorous stirring and the reaction mixture heated to reflux. Then 0.25 ml. of 1-bromobutane and 0.5 ml. of ethyl bromide were added to the reaction flask to initiate the reaction. The reaction mixture was kept at reflux for two hours. Heating was discontinued and the reaction mixture was kept at reflux by addition of the balance of the 4,4'-dibromodiphenyl-N-ethylamine ether solution over a 20 minute period. Upon completion of the addition the reaction mixture became clear and was then stirred for 30 minutes as the pot slowly cooled.

19.1 g. (0.112 mol) of dimethylphenylchlorosilane was dissolved in 50 ml. of diethylether and added over a 12 minute period from the addition funnel. This brought the reaction to reflux again. Upon completion of the addition the reaction was stirred for 7½ hours and then filtered through glass wool to remove 0.29 g. (0.042 gram-atoms) of lithium. The filtrate (ether solution) was then poured into 500 ml. of an ice solution containing 0.5 mol. of NaOH for every one mol of $NH_4Cl$ to separate the organic liquid from the salt formed. The organic layer was separated and dried overnight over anhydrous sodium sulfate. The dried ether solution was filtered through a Buchner funnel and then the solvent was completely removed from the filtrate on a Rinco solvent stripper, leaving a light yellow liquid. Distillation of the residue at 0.90 mm. pressure gave 1.66 g. of a liquid boiling at 64 to 96° C. Further distillation at 0.40 to 0.26 mm. pressure gave 3.44 g. of a liquid boiling at 90 to 184° C.

There remained in the flask 17.7 g. of residue which crystallized to give a brown solid having a melting point of 57 to 65° C. 16.3 g. of this solid was recrystallized from hot ethyl alcohol to give 6.65 g. (25.5% yield) of a white solid with a melting point of 63 to 65.5° C. This compound was identified as 4,4′-bis(phenyldimethylsilyl)diphenyl-N-ethylamine.

*Example 2*

To one liter, 3-neck flask equipped with condenser, stirrer, addition funnel and thermometer was added 100 ml. of diethylether and 1.94 g. (0.28 gram-atoms) of lithium wire (cut into 100 pieces). A solution of 20 g. (0.056 mol) of 4,4′-dibromodiphenyl-N-ethylamine in 300 ml. of diethylether was placed in the addition funnel. A few ml. of the 4,4′-dibromodiphenyl-N-ethylamine ether solution was added to the flask with vigorous stirring, stirring being continued for one hour. Then 0.5 ml. of 1-bromobutane was added and the mixture heated to reflux. Next 0.25 ml. of ethyl bromide was added and the refluxing continued for 45 minutes. The remaining amine solution was then added over a 43 minute period to maintain gentle reflux stirring was continued for 30 minutes after the completion of the addition.

A solution of 26 g. (0.112 mol) of diphenylmethylchlorosilane in 100 ml. of diethylether was then added through the addition funnel over a 35 minute period to maintain reflux. The reaction mixture was then stirred for one hour at room temperature and filtered through glass wool to remove 0.40 g. of unreacted lithium. The filtrate was then poured into 500 ml. of NH₄Cl–NaOH buffer solution to separate the organic liquid from the salt formed. The organic layer was separated and dried over anhydrous sodium sulfate. The dried ether solution was filtered and then the solvent removed to obtain 33.1 g. of a light yellow to green oil which solidified upon standing. 8.49 g. of the solid was recrystallized twice from absolute alcohol with 7.91 g. (23.9% yield) of a white solid, M.P. 131–3° C., being obtained. This solid was identified as 4,4′-bis(methyldiphenylsilyl)diphenyl-N-ethylamine.

*Example 3*

To a one liter 3-neck flask equipped with condenser, stirrer, addition funnel and thermometer was added 50 ml. of diethylether and 1.94 g. (0.28 gram-atoms) of lithium wire (cut into 70 pieces), and 90 ml. of tetrahydrofuran. 19.1 g. (0.056 mol) of 4,4′-dibromodiphenyl-N-methylamine dissolved in 300 ml. of diethylether and 65 ml. of tetrahydrofuran were added to the flask. Then 26 g. (0.112 mol) of diphenylmethylchlorosilane was added and the reaction left to stir. After stirring 5 minutes the pot temperature rose to approximately 50° C. The reaction was then left to stir overnight. After stirring overnight, no trace of lithium was observed in the reaction mixture.

The reaction mixture was filtered and then the filtrate was poured into 250 ml. of NH₄Cl–NaOH buffer solution and 250 ml. of water to separate the organic liquid from the salt formed. The organic layer was then separated and the solvent evaporated on a steam bath to give 34.3 g. of a black oil. This black oil was taken up in boiling absolute alcohol, treated with Nuchar (activated charcoal), and filtered hot. Upon standing overnight, small white crystals (M.P. 133–6° C.) began to separate from the filtrate. Recrystallization of these crystals from absolute alcohol gave 1.75 g. (5.4% yield) of a white crystalline solid (M.P. 136–8° C.). This solid was identified as 4,4′-bis(methyldiphenylsilyl)diphenyl-N-methylamine.

*Example 4*

The compounds of Examples 1 and 2 were found to possess antioxidant properties when one percent by weight of them was added to a trimethylolpropane ester fluid and tested therein.

*Example 5*

The following products are obtained when the following reactants are reacted in accordance with Example 1 and at the same mole ratios as in Example 1.

| | Reactants | | Product |
|---|---|---|---|
| | Dilithio Derivative of— | Silane | |
| 1 | 4,4′-dibromodiphenyl-N-isopropylamine | Triphenylchlorosilane | 4,4′-bis(triphenylsilyl)diphenyl-N-isopropylamine. |
| 2 | 4,4′-dibromodiphenyl-N-hexylamine | Trimethylchlorosilane | 4,4′-bis(trimethylsilyl)diphenyl-N-hexylamine. |
| 3 | 4,4′-dibromodiphenyl-N-octylamine | Decyldiphenylchlorosilane | 4,4′-bis(decyldiphenylsilyl)diphenyl-N-octylamine. |
| 4 | 4,4′-dibromodiphenyl-N-butylamine | Cyclohexyldiphenylchlorosilane | 4,4′-bis(cyclohexyldiphenylsilyl)diphenyl-N-butylamine. |
| 5 | 4,4′-dibromodiphenyl-N-ethylamine | Benzyldiphenylchlorosilane | 4,4′-bis(benzyldiphenylsilyl)diphenyl-N-ethylamine. |
| 6 | 4,4′-dibromodiphenyl-N-ethylamine | Diphenyloctylchlorosilane | 4,4′-bis(diphenyloctylsilyl)diphenyl-N-ethylamine. |
| 7 | 4,4′-dibromodiphenyl-N-ethylamine | Diphenyltolylchlorosilane | 4,4′-bis(diphenyltolylsilyl)diphenyl-N-ethylamine. |
| 8 | 4,4′-dibromodiphenyl-N-dodecylamine | Diphenylethylchlorosilane | 4,4′-bis(diphenylethylsilyl)diphenyl-N-dodecylamine. |
| 9 | 4,4′-dibromodiphenyl-N-ethylamine | Diphenyloctadecylchlorosilane | 4,4′-bis(diphenyloctadecylsilyl)diphenyl-N-ethylamine. |
| 10 | 4,4′-dibromodiphenyl-N-octadecylamine | Diphenylpropylchlorosilane | 4,4′-bis(diphenylpropylsilyl)diphenyl-N-octadecylamine. |

That which is claimed is:

1. A lubricating fluid containing 0.2 to 5 percent by weight of a compound of the formula

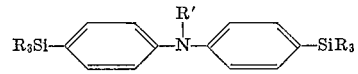

wherein R is a monovalent hydrocarbon group free of aliphatic unsaturation containing from 1 to 18 inclusive carbon atoms and R′ is an alkyl group containing from 1 to 18 inclusive carbon atoms.

2. A lubricating fluid as defined in claim 1 which is a trimethylolpropane triester fluid.

3. A lubricating fluid as defined in claim 2 wherein the compound is 4,4′-bis(phenyldimethylsilyl) diphenyl-N-ethylamine.

4. A lubricating fluid as defined in claim 3 wherein the compound is 4,4′-bis(methyldiphenylsilyl)diphenyl-N-ethylamine.

References Cited

UNITED STATES PATENTS 2,960,517   11/1960   Schnabel _____ 252—49.6 X
3,065,251   11/1962   Jones et al. _____ 252—49.6 X DANIEL E. WYMAN, *Primary Examiner.*

PATRICK P. GARVIN, *Examiner.*

W. H. CANNON, *Assistant Examiner.*